United States Patent [19]

Pessot et al.

[11] Patent Number: 4,918,751

[45] Date of Patent: Apr. 17, 1990

[54] METHOD FOR OPTICAL PULSE TRANSMISSION THROUGH OPTICAL FIBERS WHICH INCREASES THE PULSE POWER HANDLING CAPACITY OF THE FIBERS

[75] Inventors: Maurice Pessot; Gerard A. Mourou, both of Rochester, N.Y.

[73] Assignee: The University of Rochester, Rochester, N.Y.

[21] Appl. No.: 104,749

[22] Filed: Oct. 5, 1987

[51] Int. Cl.$^4$ .............................................. H04B 9/00
[52] U.S. Cl. ........................................ 455/608; 370/1; 455/600; 455/612; 330/4.3
[58] Field of Search ............... 455/612, 600, 603, 606, 455/607, 608, 616, 617, 618, 619; 370/1, 3, 4; 331/4.3

[56] References Cited

PUBLICATIONS

Weik, Communication's Standard Dictionary, 1983, Definitions of Chirp, Pulse Frequency Modulated Signal, Source Chirp, PCM.
Weiner, "Frequency Domain Coding of Fenatosecond Pulses for Spread Spectrum Communication", May 1, 1987, Proceedings on Conference of Lasers and Electrooptics, pp. 294–296.
Grischkowsky et al., "Optical Pure Compression Based on Enhanced Frequency Chirping", Appl. Phys. Let., vol. 41, #1, Jul. 1, 1982, pp. 1–3.
Mourou et al., "Short Pulse Amplification Using Pulse Compression Techniques", Laser Focus, Feb., 1986.
Strickland et al., "Compression of Amplified Chirped Optical Pulses", Opt. Communications, Dec., 1985.
Fork, "Femtosecond Optical Pulses", IEEE Journal of Quant. Electronics, vol. QE-19, No. 4, 4–83, pp. 500–505.
W. J. Tomlinson, R. H. Stolen, and C. V. Shank, "Compression of Optical Pulses Chirped by Self-Phase Modulation in Fibers", JOSA B 1, 139–149 (1984).
"Short-Pulse Amplification Using Pulse-Compression Techniques", LLE Review 25, 42, Oct.-Dec., 1985.
D. Marcuse and C. Lin, "Low Dispersion Single-Mode Fiber Transmission-The Question of Practical vs. Theoretical Maximum Transmission Bandwidth", IEEE J Quantum. Elect. QE-17, 869–878 (1981).
R. G. Smith, "Optical Power Handling Capacity of Low Loss Optical Fibers as Determined by Stimulated Raman and Brillouin Scattering", Appl. Opt. 11, 2489–2494 (1972).
R. H. Stolen and E. P. Ippen, "Raman Gain in Glass Optical Waveguides", Appl. Phys. Lett. 22, 276-281 (1973).
R. H. Stolen and C. Lin, "Self-Phase Modulation in Silica Optical Fibers", Phys. Rev. A 17, 1448–1453 (1978).
L. G. Cohen, W. L. Mannel, S. J. Jang, and A. D. Pearson, "High-Bandwidth Single-Model Fibers", 9th European Conference on Optical Comm. H. Melchior and A. Sollberger, ed., Elsevier Science Publishers B.V. (North Holland) (1983).
D. N. Payne and W. A. Gambling, "Zero Material Dispersion in Optical Fibers", Electronics Lett., 11, 176–178 (1975).

(List continued on next page.)

Primary Examiner—Douglas W. Olms
Assistant Examiner—L. Van Beek
Attorney, Agent, or Firm—Martin LuKacher

[57] ABSTRACT

A method for transmitting high energy subpicosecond pulses through single-mode optical fiber without stimulating nonlinear effects as are caused by self-phase modulation or Raman generation, which method increases the average power handling capacity of the fiber. The optical pulses, which may be modulated to carry data, as by pulse code modulation, are increased in temporal width before launching into the fiber. The output pulses from the fiber are compressed. Since the nonlinear effects are related to the peak power of the pulses, these effects are avoided while increasing the average power and allowing the use of the available bandwidth of the fiber thereby enabling greater data transmission rates.

11 Claims, 6 Drawing Sheets

OTHER PUBLICATIONS

C. Lin, H. Kogelnik, and L. G. Cohen, "Optical Pulse Equalization and Low Dispersion Transmission in Single-Mode Fibers in the 1.3–1.7 μm Spectral Region", *Opt. Lett.* 5, 476–478 (1980).

E. Brookner, "Phased-Array Radars", *Scientific American* 252(2), 94, (1985).

M. Pessot, P. Maine, and G. Mourou, "1000 Times Expansion/Compression of Optical Pulses for Chirped Pulse Amplification", *Opt. Commun.* 62, 419 (1987).

O. E. Martinez, "3000 Times Grating Compressor with Positive Group Velocity Dispersion: Application to Fiber Compensation in 1.3–1.6 μm Region", *IEEE J. Quantum. Elect.* QE-23, 59–64 (1987).

E. B. Treacy, "Optical Pulse Compression with Diffraction Gratings", *IEEE J. Quantum. Elect.* QE-5, 454–458 (1969).

140-fs PULSE
2.2-pJ ENERGY
65-Å FWHM 140-fs PULSE
3.3-pJ ENERGY
130 Å FWHM 80-ps PULSE
15-nJ ENERGY
65-Å FWHM 80-ps PULSE
8.2-nJ ENERGY
53-Å FWHM

METHOD FOR OPTICAL PULSE TRANSMISSION THROUGH OPTICAL FIBERS WHICH INCREASES THE PULSE POWER HANDLING CAPACITY OF THE FIBERS

The U.S. Government has rights in this application pursuant to contract No. F49620-87-C-0016.

INTRODUCTION

The present invention relates to optical communications through the use of optical pulses which are transmitted along optical fibers, and particularly to a method whereby ultrashort optical pulses of sufficient peak power to stimulate nonlinear effects can be transmitted with optical fibers without such effects thereby enabling the use of ultrashort (femtosecond-fs) duration range pulses at high peak power (kilowatt range and higher) for optical communication along optical fibers.

The invention is especially suitable for use in data communications over single-mode optical fibers by pulses which can represent, as by pulse code modulation (PCM), the bytes of data.

BACKGROUND

The publications and other materials referred to in this Specification are for convenience numerically referenced in the following text and grouped under the heading "References."

Optical fiber systems have the potential for extremely high communication rates. Existing monomode fiber systems have demonstrated transmission rates as high as 8 Gbits/second. Although quite large, this is still only a small fraction of the available bandwidth. Full utilization of the low-loss window in the 1.3–1.5 micrometer ($\mu$m) region leads to a potential bandwidth on the order of 30 THz. The limitation on the data transmission, thus, becomes the modulator, and as modulator bandwidths increase, we can expect to see larger and larger transmission rates.

Digital communication system that utilize even a fraction of the potential bandwith available in a single-mode fiber must work with pulses in the femtosecond range.

There are certain disadvantages to working with such ultrashort pulses:

Short pulses have broad spectral widths.

With broad spectra, group velocity dispersion (GVD) can become the limiting factor in the available bandwidth of an optical fiber communications system. Short pulses, at quite modest energies, quickly lead to peak intensities sufficient to cause nonlinear effects in fibers. The confining nature of the optical waveguide is ideal for providing long interaction lengths for such phenomena. These nonlinear effects (e.g. self-phase modulation, Raman generation) generally lead to the creation of excess spectral content (even possibly the existence of pulses which did not exist at the input) which aggravate the GVD problem and further limit the useful bandwidth.

A number of solutions to the first problem have been described:

Manufacture of ultrabroadband waveguides through the use of novel refractive index profiles.

Operation at the wavelength of zero material dispersion. At this wavelength, the first order dispersion vanishes and the second order dispersion dominates.

Optical pulse equalization using positive-negative dispersion compensation. This involves splicing together fibers with different dispersion characteristics to minimize the first order dispersion.

Marcuse has discussed these last two ideas thoroughly, along with limitations due to other sources of dispersion such as polarization mode dispersion.

All of these solutions to the GVD problem strive to keep a pulse together—in and of itself this is a desirable feature of any communications system. This, however, has an adverse effect when one looks at the limitations that this imposes on the average power handling capacities of an optical fiber.

Consider the limitations imposed on a digital communication system by the nonlinear processes of Brillouin scattering, Raman scattering, and self-phase modulation. In order to simplify the analysis somewhat, we restrict ourselves to a digital communication system and ignore any effects of GVD within the fiber.

The growth of a stimulated Brillouin and Raman signal has been examined by R. G. Smith. Expressions for the critical peak pump (input) power are derived. When $P > P_{CRIT}$, significant energy transfer to the stimulated Brillouin or Raman signal occurs.

For Brillouin scattering:

$$P_{CRIT}^{BRILL} \sim 21(A\ \alpha_p/\gamma_o)$$

where
$A$ = x-sectional area of fiber (cm$^2$)
$\alpha_p$ = exponential loss coefficient (cm$^{-1}$)
$\gamma_o$ = Brillouin gain (cm/w)
For Raman scattering a similar result holds:

$$P_{CRIT}^{RAM} \sim 16(A\ \alpha_p/\gamma_o)$$

where $\gamma_o$ is now the Raman gain. A typical loss coefficient at $\sim 1.3$ $\mu$m is 0.5 dB/km (0.115/km). The Brillouin gain for quartz is $\sim 3 \times 10^{-9}$ cm/W. The Raman gain is $\sim 1.8 \times 10^{-11}$ cm/W. Using these numbers in the above expressions (for a core area of $10^{-7}$ cm$^2$) we get values of $$P_{CRIT}^{RAM} \sim 100\ \text{mW and}\ P_{CRIT}^{BRILL} \sim 0.8\ \text{mW}$$

However, because the Brillouin gain bandwidth is only $\sim 50$ MHz wide, we must multiply this by $(\Delta\nu_{PUMP})/(\Delta\nu_{BRILL})$. This makes $$P_{CRIT}^{BRILL} >> P_{CRIT}^{RAM}$$

and we will no longer consider Brillouin scattering; the Raman process, having a very large bandwidth $(\Delta\nu_{RAMAN} >> \Delta\nu_{PUMP})$ will be the dominant effect of the two. The critical power for self-phase modulation has been defined as:

$$P_{CRIT}^{SPM}\ (\text{Watts}) = 10^{-7}\ nc\lambda\ A_{eff}/4\pi^2\ n_2\ L$$

where $n_2$ is the nonlinear part of the index of refraction ($1.1 \times 10^{-13}$ esu). For the same parameters as above, this evaluates to $$P_{CRIT}^{SPM} \sim 15\ \text{mW}$$

for a 10 km fiber.

At peak powers of 15 mW and 100 mW, a 100 fs pulse has energies of 1.5 and 10 femtojoules (fJ), respectively. Even at a 10 GHz repetition rate, the average powers are still only at the milliwatt level.

The onset of any of these effects is a hindrance to accurate transmission of data, and leads to new (and undesirable) spectral content. In addition, the low powers place stringent requirements on splicing losses and necessitate frequent use of expensive, electronic repeating stations.

SUMMARY OF THE INVENTION

It has been discovered in accordance with the invention that a solution to this problem is a process for optical pulse communications wherein each pulse is shaped (stretched) prior to injection into the fiber in a well controlled manner which (1) does not change the spectral content of the pulse and (2) can be completely reversed, restoring the pulse to its original shape and duration.

Stimulated Raman Scattering (SRS) and SPM are peak power dependent processes (actually SPM is proportional to dP/dt). Stretching the pulse in a controlled manner to many times its original duration in order to reduce its peak power will delay the onset of these nonlinear effects to higher energies, allowing a greater average power throughput for a given repetition rate. Reversing the initial process and restoring the pulse to its original shape and duration allows for a complete recovery of information. Taking SPM as an example, if we stretch a pulse of energy $\epsilon$ and duration $\tau$ by a factor of Q, we reduce the strength of the SPM interaction by $Q^2$, because $$\frac{dP}{dt} \approx \frac{\epsilon}{\tau^2}$$

So for a given length of fiber, stretching a pulse by a factor of 1000 can allow an increase by a factor of $1000^2$ in the pulse energy (and average power) that the fiber can handle before SPM becomes significant. At the same time, the Raman interaction is also reduced by Q, delaying the onset of SRS to higher average powers. However, because the strength of the interaction for Raman is not reduced as quickly as for SPM, at some point SRS may become the dominant nonlinear process.

It is therefore the principal object of the invention to provide an improved method of optical pulse transmission over optical fibers.

It's another object of the invention to provide an improved method whereby data (pulse repetition) rates in single mode optical fibers and their power handling capacity can be increased by the use of positive and negative GVD external of the fibers.

The foregoing objects, features, advantages, and solutions to problems which advance the technology of optical communications will become more apparent from a reading of the following description in connection with the accompanying drawings.

DETAILED DESCRIPTION

Figure 1:
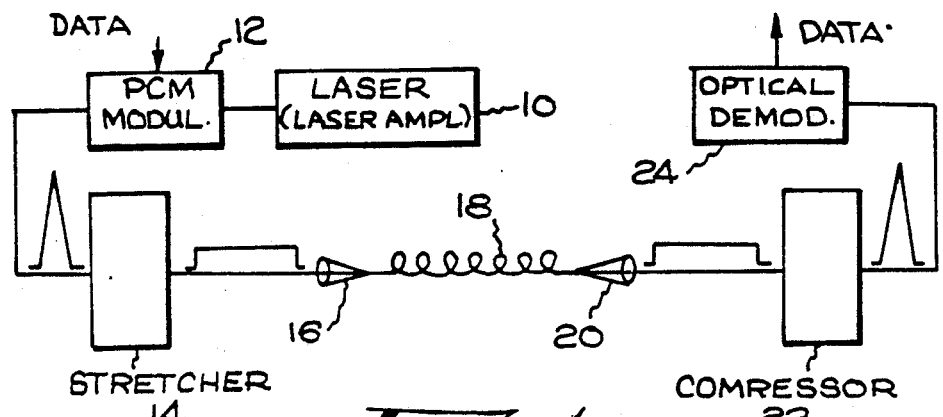
FIG. 1 is a schematic diagram of a system wherein an embodiment of the invention is carried out.

FIG. 1 shows components, which are described in greater detail hereinafter, for optical pulse communication in accordance with the invention. A laser 10 generates ultrashort optical pulses which may be in sync with pulses representing data bits. The latter are applied to an optical modulator 12 (which may include a birefringent material cell and polarizers of the type known in the art) to produce input pulses to a pulse stretcher 14. The stretched pulses are launched by an optical device (a lens system) 16 into a single-mode fiber 18. The pulses are obtained by a device 20 like device 16 and applied to a compressor 22. A demodulator (e.g., a photoelectric device) 24 translates the compressed pulses into a high data rate PCM bit stream.

The system of FIG. 1 consists of three principal parts namely; the pulse stretcher 14, whose action is to take a short input pulse and stretch it to many times its original duration; the fiber 18, which we assume to be lossless and to have no GVD. Both these assumptions are reasonable in the 1.3–1.5 μm region; and the pulse compressor 32, whose action is exactly the reverse of the stretcher 14, restoring the pulse to its original shape and duration.

Since linear propagation occurs, the system can be accurately modeled by the linear systems theory. The input pulse is given by the quantity E(t), which has a Fourier transform E(w) given by:

$$E = \int_{-\infty}^{+\infty} dt\, E(t) e^{iwt}$$

and a power spectrum which is given by $|E(w)|^2$. The pulse stretcher 14 is described by a complex transfer function in frequency space, T(w), so that the pulse, after the stretcher, is given by:

$$E'(t) = \int_{-\infty}^{+\infty} E(w) T(w) e^{-iwt} \frac{dw}{2\pi}$$

The fiber 18, being modeled as having no losses and no GVD, leaves the pulse unchanged. The pulse compressor 22 acts to reverse the action of the pulse stretcher, so it has a transfer function $T^*(w)$, and the output of the system is then:

$$E''(t) = \int_{-\infty}^{+\infty} E(w)T(w)e^{-iw_t w t} \frac{dw}{2\pi}$$

↑  ↑   ↑
       input  |   |
            stretch |
                  compress

The requirement that the output of the system be identical to the input indicates that $T(w)$ affect the phase only, i.e., $T(w)T^*(w)=1$ implies $T(w)=e^{i\phi(w)}$. Under these conditions, the output $E''(t)$ is identical to the input.

Although pulse stretching and compression has been used in chirped microwave radar in which the microwave pulse is stretched before it is broadcast, and the received echo is again electronically compressed to its original duration, and in the generation of high power, ultrashort pulses, the method provided by the invention increases pulse transmission rates, and power handling capacity of single mode optical fibers by virtue of the use and application thereof to optical communications.

Figure 2:
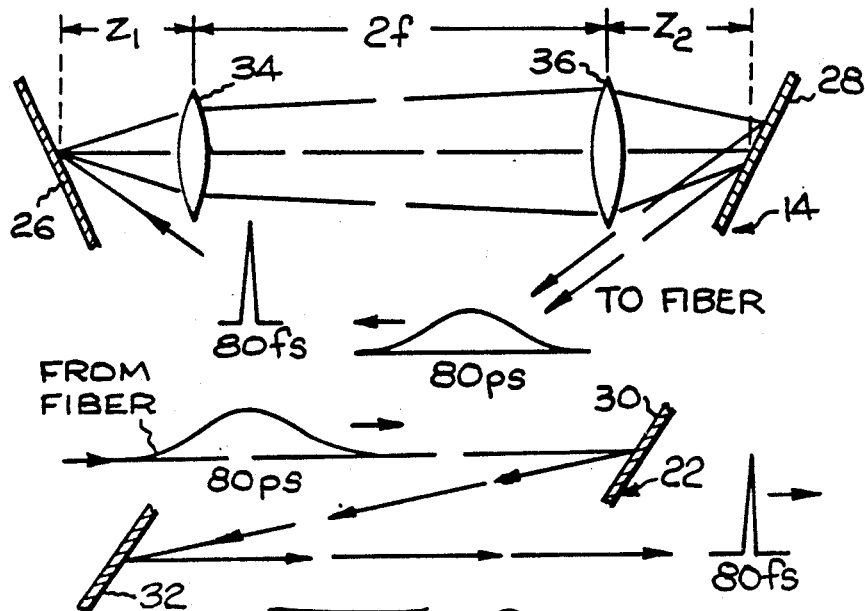
FIG. 2 is a more detailed schematic diagram than FIG. 1, showing grating pulse temporal stretching and compression techniques used in accordance with the invention.

As shown in FIG. 2, a first pair of gratings 26, 28 is used as the stretcher 14 and a second diffraction grating pair 30, 32 is used as the compressor 22, in positive and negative GVD configurations, respectively, to stretch a pulse (e.g., by 1000 times) and then compress it back to its original duration. The fiber 18 is located between the two pairs 26, 28 and 30, 32 of gratings. For purposes of illustration, pulse energies at which nonlinear effects can state to occur are discussed below for both the short input pulse to the system (−140 fs) and for the stretched pulse (−80 ps).

Figure 3:
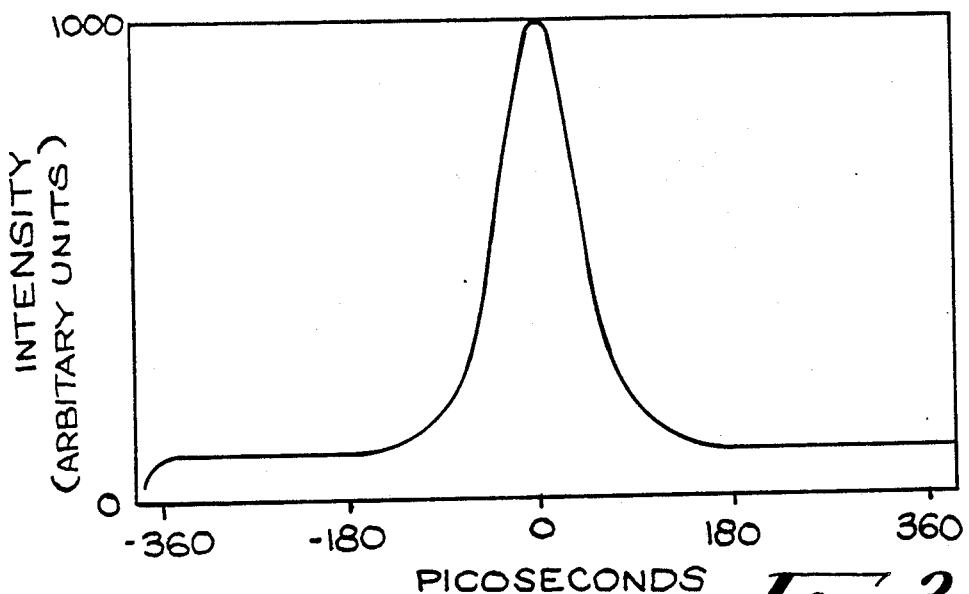
FIG. 3 is a curve showing the shape of an exemplary pulse [pulse width 85 picoseconds (ps)—full width half maximum (FWHM)], such as a streak camera trace.

In the illustrative system of FIG. 2, two 1700 line/mm gratings 26 and 28 are arranged in an antiparallel configuration, separated by 128 cm. A telescope of unit magnification consisting of two 500 mm focal length lenses 34, 36 is placed between the grating pair. This arrangement has a positive GVD. FIG. 3 shows a streak camera trace of an 80 fs pulse after stretching by the first grating pair 26, 28. It has now been stretched to ∼80 ps.

The second pair of gratings 30, 32 may be identical to the first. This pair is arranged in a negative GVD configuration, and compresses the pulse. In order that they fully compensate for the first pair, the grating separation of the second pair should be $2f-(z_1+z_2)$, where f, $z_1$, $z_2$ are the distances denoted in FIG. 2.

Figure 4:
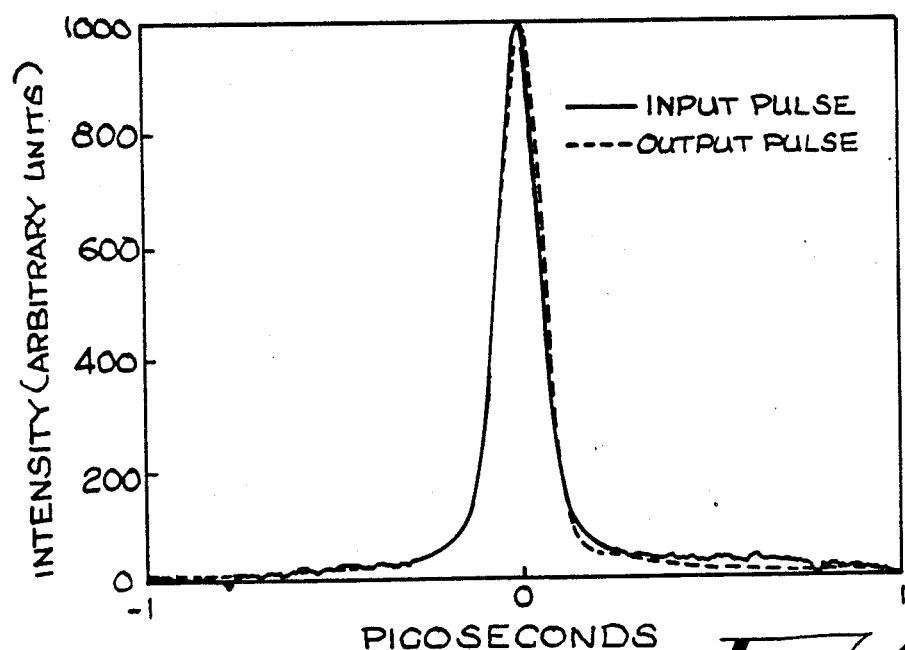
FIG. 4 are curves similar to FIG. 3 showing an input pulse to the stretcher and a corresponding output pulse from the compressor.

FIG. 4 compares the input pulse to the system to the pulse which has been stretched to 80 ps and compressed again. The correlation widths indicate pulse durations of 83 and 91 fs respectively (assuming a sech$^2$ deconvolution factor).

FIG. 4 shows that the grating arrangements satisfy the requirements of identity of the input and output of the system. The transfer function is a pure phase transfer function, and has no effect on the power spectrum.

The pulses may be obtained from a femtosecond dye laser and then amplified to microjoule energies. Measurements were made of the energy at which nonlinear effects began to occur and presence of nonlinear effects was detected by monitoring the laser spectrum, to illustrate the improvements provided by the invention.

FIG. 5 shows the output spectrum of a 140 fs pulse coupled into a 10 meter long single-mode fiber. The fiber was of the polarization type and has a 4 μm diameter core. FIG. 5(a) is for an energy of 2.2 pJ. No nonlinear effects are evident, the 65 Å spectrum is identical to that of the input pulse to the fiber. When the energy is increased to 3.3 pJ, the spectrum in FIG. 5(b) results. The spectrum has doubled to −130 Å; the structure is characteristic of a broadening due to SPM.

Figure 5A:
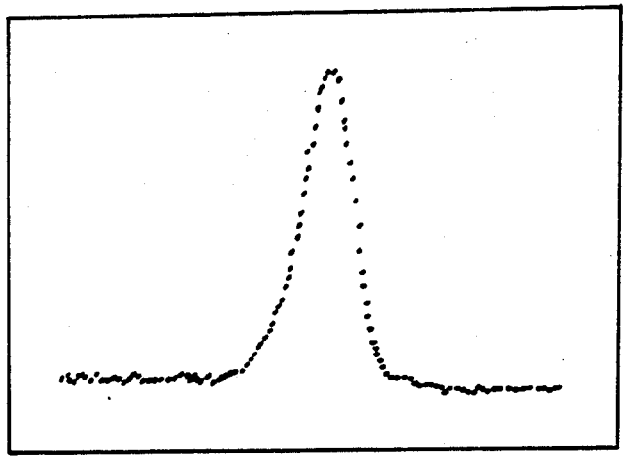
FIGS. 5(a), (b), (c), and (d) are curves showing the spectrum of exemplary pulses at different width at the output of the fiber.
Figure 5B:
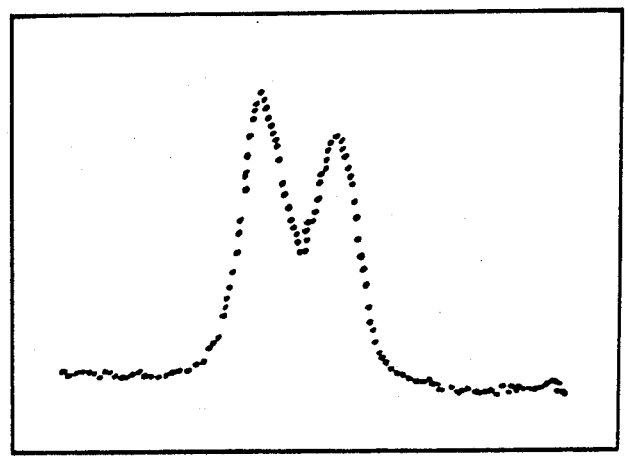
Figure 5D:
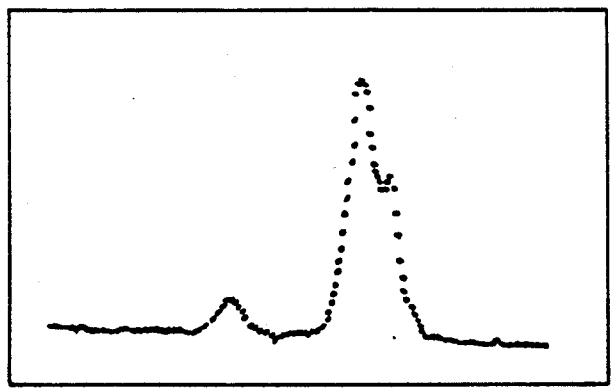
Figure 5C:
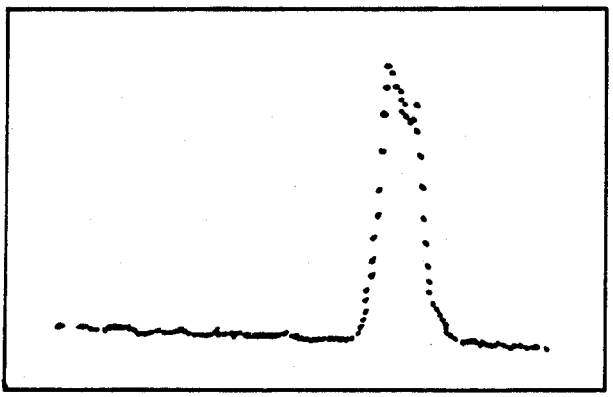

Next the pulse was first propagated through the first grating pair to stretch it to 80 ps. This stretched pulse was now coupled into the fiber. The resulting spectra at energies of 8.2 nJ and 15.1 nJ are shown in FIGS. 5(c) and (d), respectively. Nonlinear effects are delayed until ∼15.1 nJ of energy are coupled through the fiber. Both SPM and SRS are present. This is to be compared with the ∼3 pj threshold for the short pulse, an improvement of −5000 times in average power handling capacity of the fiber. The fiber output was then directed to the second grating pair 30, 32, using another microscope objective on the coupling device 18 (FIG. 1), and compressed to a pulse duration of less than 0.4 ps (see FIG. 7). There is some incomplete compression is due to GVD in the fiber itself, at the wavelength used (620 nm).

Since the spectral width of a pulse broadened by SPM is proportional to $$\frac{dP}{dt} \alpha \frac{\epsilon}{\tau^2}$$

it would be expected that stretching the pulse from 140 fs to 80 ps should raise the energy threshold by ∼(80 ps/140 fs)$^2$. This is substantially larger than the observed suppression of 5000 times. In order to reconcile this with the experiment, we must take into account the combined effects of GVD and SPM.

The effect of GVD on the pulse is to stretch it out, reduce the peak power, and effectively shorten the interaction length over which SPM can occur. The spectral width of a pulse which has undergone SPM is:

$$\Delta W_{SPM} \simeq \frac{\epsilon}{\tau^2} \frac{n_2 w_c z}{c}$$

where
$\epsilon$ = pulse energy
$\tau$ = pulse duration
z = interaction length
$n_2$ = nonlinear index of refraction
$w_c$ = optical frequency The prior estimate for the increased energy threshold implicitly assumed that the interaction length was the same as the fiber length. This holds only under certain condition. An important parameter describing pulse propagation in an optical fiber is the normalized length $z_o$, defined by:

$$z_o = \frac{0.322 \, \pi^2 c^2 \tau^2}{\lambda D(\lambda)}$$

where $D(\lambda)$ is the normalized dispersion constant.

The significance of $z_o$ is that it is the distance over which a pulse of duration $\tau$ will approximately double in width solely due to the action of GVD. As such, the bulk of the spectrum generated by SPM occurs in a distance of $z \leq z_o$.

In general, the energy thresholds for SPM to generate a given amount of spectrum $\Delta w$ are related by:

$$\frac{\epsilon_L^{TH}}{\epsilon_{SH}^{TH}} = \frac{z^{SH} \tau_L^2}{z^L \tau_{SH}^2}$$

where the sub and superscripts refer to the short (input) pulse and the long (stretched) pulse respectively. We now distinguish between three cases:

(i) Fiber length $L<<z_o^L$, $z_o^{SH}$ the normalized distances for the long and short pulses respectively. In this case both pulses see an interaction throughout the length of the fiber to that $z^{SH}=Z^L=L$ and the previous equation reduces to $$\frac{\epsilon_L^{TH}}{\epsilon_{SH}^{TH}} = \frac{\tau_L^2}{\tau_{SH}^2}$$

In this case stretching the pulse by a factor Q increases the energy threshold by $Q^2$. This situation corresponds to one in which GVD within the fiber is negligible.

(ii) $z_o^{SH}<L<z_o^L$

For this case, $z^{SH}=z_o^{SH}$ and $z^L=L$ and we get:

$$\frac{\epsilon_L^{TH}}{\epsilon_{SH}^{TH}} = \frac{z_o^{SH} \tau_L^2}{L \tau_{SH}^2}$$

In this case GVD within the fiber is significant for the short pulse.

(iii) $z_o^{SH}, z_o^L << L$

Then $z^{SH}=z_o^{SH}$ and $z^L=z_o^L$ and we get:

$$\frac{\epsilon_L^{TH}}{\epsilon_{SH}^{TH}} = \frac{z_o^{SH} \tau_L^2}{z_o^L \tau_{SH}^2}$$

GVD is significant for both pulses here. For this case we can also use the previous relation showing $z_o$ is proportional to $\tau^2$ to show that, for the case where $$z_o^{SH}, z_o^L << L, \epsilon_L^{TH} = \epsilon_{SH}^{TH}$$

so that the technique described here has no advantage in this situation.

In the primary region of interest, around 1.3–1.5 μm, $D(\lambda)$ approaches zero and $z_o$ gets very large, so that most systems will not fall into this category.

If we evaluate $z_o$ for 140 fs and 80 ps pulses respectively, we get $z_o^{SH}=17$ cm and $z_o^L=55$ km so that the case (ii) above is obtained. The theoretical increase in the energy threshold of 5500 times, is in very good agreement with the experimental results.

Figure 6:
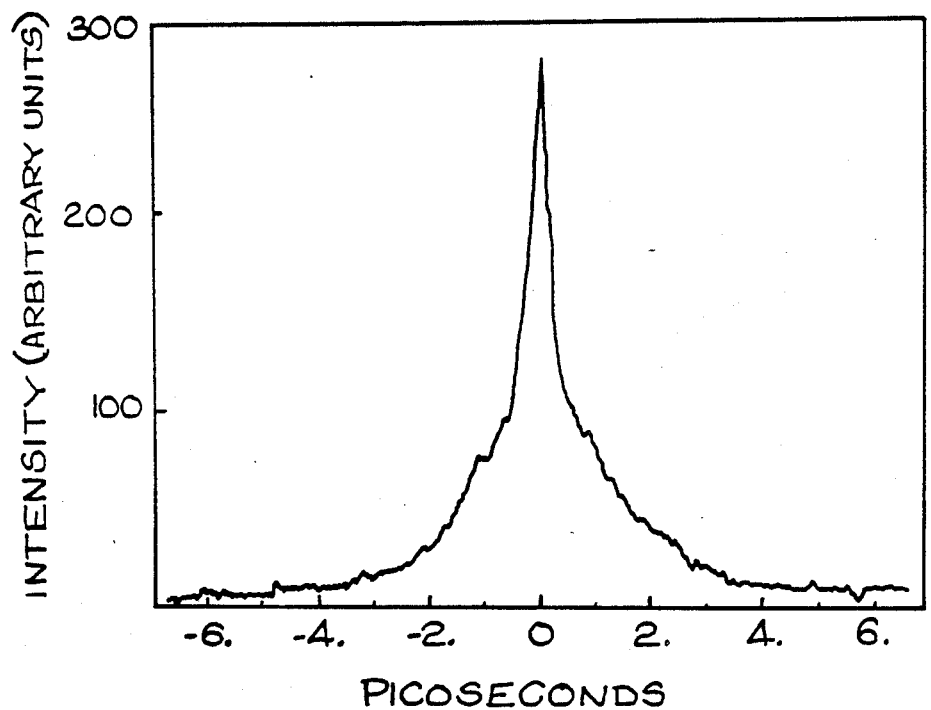
FIG. 6 is a curve showing the autocorrelation of a compressed pulse which as an example is 380 fs, FWHM; the curve is made with $sech^2$ deconvolution.

The incomplete compression of the pulse exiting the fiber to about 0.4 ps is due to the mismatch in the dispersive properties between the fiber and grating pair. At 620 nm, GVD in the fiber is sufficient to broaden the stretched pulse even further, to 95 psec. By readjusting the compression grating spacing we can compensate this additional source of GVD and compress the pulse to 0.4 ps. This adjustment only corrects for the first order chromatic dispersion however, and cannot correct for the higher order dispersion. Calculations indicate this residual dispersion to be 280 fs. It is this higher order quadratic dispersion which causes the pronounced wings evident in the autocorrelation in FIG. 6. This effect due to the fiber/grating dispersion mismatch would be greatly reduced in a wavelength region near the zero material dispersion point. A full discussion of the use of grating to compensate for fiber dispersion is presented to Ref. 10.

Figure 7A:
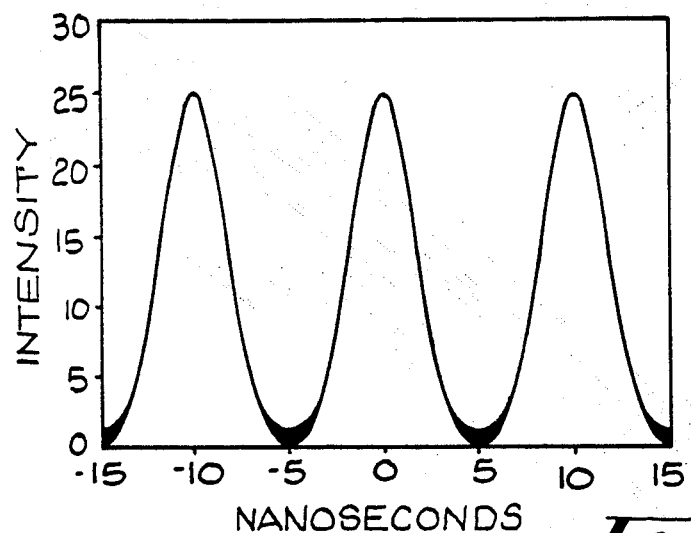
FIGS. 7(a) and (b) are curves showing the temporal expansion of an exemplary 100 fs pulse to 4 ns and 7–8 ns, respectively.
Figure 7B:
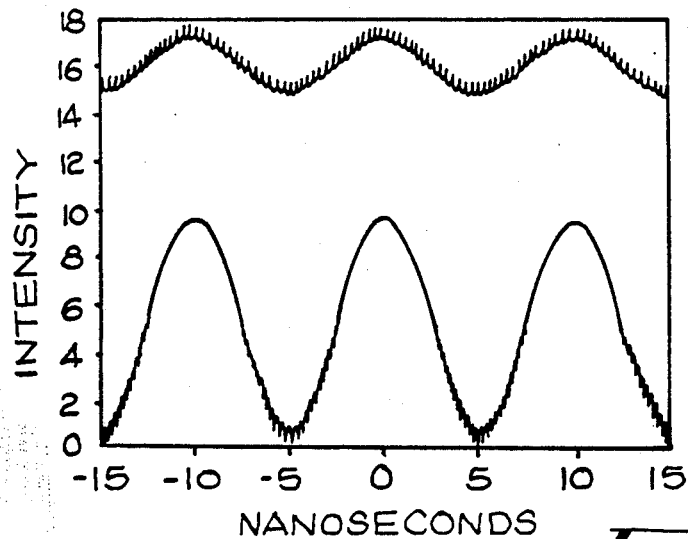

The digital communications system can be driven by a high repetition rate source, such as a mode-locked laser 10. The duty cycle of the source places an upper limit on the peak power reduction available with this technique. As the pulse is stretched the peak power is reduced correspondingly until the stretch factor Q approaches $T/\tau$, where T is time between pulses and $\tau$ is the pulse width. Now the pulses begin to overlap, and start to develop a strong high frequency modulation in the region of overlap. This modulation results from the mixing of neighboring pulses, each of which has a positive chirp, so that the low frequency end of one pulse beats with the high frequency end of the adjacent pulse. FIG. 7(a) illustrates this phenomenon for the case of a train of 100 fs pulses at 10 ns intervals which have been stretched to 4 ns. The peak power has been reduced by nearly 5 orders of magnitude. Any further stretching serves to increase the depth of modulation throughout the pulse train, without a further decrease in peak power. FIG. 7(b) shows an extreme example of this, with a 100 fs pulse train stretched to 7.5 ns. With a further increase in pulse width a quasi-cw state is reached, where the depth of the high frequency modulation approaches unity.

The temporal overlap of adjacent pulses should not present any problems. There is no actual coupling to cause energy transfer from one pulse to another, and the pulse train can still be correctly "decoded" by the compression grating pair.

Also sync is never lost, the expansion gratings advance or delay a particular frequency according to whether it is above or below the carrier frequency of the pulse. Since relative delays are involved, the carrier frequency does not change position in time. For example, for a chain of pulses coming every 10 ns, the carrier frequency also appears every 10ns, with the rest of frequency content delayed or advanced with respect to it.

When the pulses overlap, we have two (or possibly more, if we stretch them enough) frequency located at the same point in time. At the point of overlap, we have two frequencies $\omega_o - K\tau$ arising from the later pulse, and $\omega_o + K\tau$ arising from the earlier pulse. One frequency is higher than $\omega_o$, another is lower, i.e., one has been advanced in time ($\omega_o + K\tau$) relative to the carrier, the other has been delayed. The compression gratings introduce another relative delay of the opposite sense. Even though both frequencies are present at once the gratings act independently on the two frequencies. This is a general property of any linear system. Therefore $\omega_o + K\tau$, which has advanced in time, is delayed, and $\omega_o + K\tau$, which was delayed in time, is advanced, restoring the order present originally. Even though pulses overlap, they maintain their identities, as the frequencies do not actually mix, they coexist in the same point of space and time, unaware of the presence of any other frequencies. Only a nonlinear interaction occurring before the reassemble can destroy this.

From the foregoing discussion it will be apparent that an improved method of optical communication has been provided which allows single-mode optical fiber communication systems to transmit much higher average powers without the occurrence of nonlinear processes that are normally present. External manipulation of the pulses with diffraction grating pairs in positive and negative GVD configurations at this input and output led to an increase of 5000 times in the energy that would be transported. Distinct situations have been identified for which the technique is, or is not, applicable and ultimate limitations due to source repetition rates and pulse widths are discussed. Although the system is described as applicable to a digital communication system which utilizes single-mode optical fiber, other optical communications system may find the method useful and modifications and variations of the herein described method within the scope of the invention will undoubtedly suggest themselves to those skilled in the art. The foregoing discussion should therefore be taken as illustrative and not in a limiting sense.

We claim:

1. The method of optical communication of optical pulses over an optical fiber which increases the pulse power handling capacity of the fiber and which comprises the step of stretching and compressing the pulse at opposite ends of the fiber, said compressing step being carried on after the pulse is transmitted through the fiber, said stretching step being a plurality of orders of magnitude and being sufficient to reduce the peak power of the pulses while being transmitted through the fiber to avoid non-linear peak power dependent effects.

2. The method according to claim 1 wherein said stretching step is carried out prior to injection of the pulse into the fiber, said stretched pulse is then injected into the fiber, at it input end, said stretched pulse is derived from said fiber at its output end, and said compressing step is carried out on said derived pulse.

3. The method according to claim 1 wherein said stretching step and compressing step are carried out linearly to restore the pulse to its original shape and duration as existed prior to the compressing step.

4. The method according to claim 1 wherein said stretching step is carried out by positive GVD and said compressing step is carried out be negative GVD.

5. The method according to claim 4 wherein said stretching step is carried out in a first grating pair and said compressing step is carried out in a second grating pair.

6. The method according to claim 5 wherein said stretching step is carried out by arranging the grating of said first grating pair in antiparallel configuration and arranging a telescope between the gratings of the pair through which the input pulse passes.

7. The method according to claim 6 wherein said compressing step is carried out be arranging the gratings of said second grating pair in parallel configuration and separating the grating by a distance where they fully compensate for the expansion of the duration of said pulse by said first grating pair and telescope.

8. The method according to claim 1 further comprises generating a train of said input pulses which represent data in accordance with PCM, and deriving said PCM data after said compressing step.

9. The method according to claim 1 wherein said pulses prior to stretching and after compression are in the femtosecond range and said stretched pulses are in the picosecond range.

10. The method according to claim 1 wherein the peak energy of said pulses prior to stretching and after compressing are at least the picojoule range and the peak energy of said stretched pulses are no higher than the nanojoule range.

11. The method according to claim 1 wherein said stretching step is carried out to reduce the peak power of said pulse at least about 5 orders of magnitude.

* * * * *